United States Patent [19]

Skoglie

[11] Patent Number: 4,826,029
[45] Date of Patent: May 2, 1989

[54] STOPPER AND METHOD OF USE IN ASSOCIATION WITH WINE BARRELS

[76] Inventor: Larry Skoglie, 5420 Graham Rd., Felton, Calif. 95118

[21] Appl. No.: 199,597

[22] Filed: May 27, 1988

[51] Int. Cl.[4] .............................................. B15D 39/00
[52] U.S. Cl. ..................................... 217/110; 215/355
[58] Field of Search ........................ 217/110; 220/307; 215/355, 364

[56] References Cited

U.S. PATENT DOCUMENTS

| | | |
|---|---|---|
| 766,206 | 8/1904 | Westling ............................ 217/110 |
| 2,657,817 | 11/1953 | Alvear ................................. 217/110 |
| 2,701,882 | 2/1955 | Parsons .............................. 217/110 |
| 2,950,835 | 9/1958 | Alvear ................................. 217/110 |
| 3,982,649 | 9/1976 | Wanderer ........................... 217/110 |

*Primary Examiner*—George T. Hall
*Attorney, Agent, or Firm*—The Dulin Law Firm

[57] ABSTRACT

In accordance with the invention a frustoconically shaped stopper formed of silicone rubber approved by the FDA for use in wine making (such as methylvinylpolysiloxane elastomers) can be releasably sealed to a wine barrel, but still provide for sampling of the wine and/or release of the fermentation gases. In this way, all equipment needed for venting, heating and tasting wine can be placed and used in a convenient arrangement with minimum expenditure of time and effort. In one aspect, the stopper of the invention includes a central opening attended by an integral pliant plug having a shaft of length $L_0$. The central opening is defined by a circular cross section and a length L (measured between an annular base and a truncated tip surface) where $L_0$ is less than L. A side wall of thickness T is defined. The thickness T varies as a function of the length along the central opening. The side wall is rigid, however. Hence, its frustoconical surface can be sealed, air-tight, to the barrel bung, with the auxiliary plug inserted within the central opening without the use of external sealants, waxes and the like. Yet side wall pressure acting as the auxiliary plug is neither too large to prevent manual removal of the plug for sampling purposes nor too small to permit ambient air back into the barrel between the co-acting surfaces. In another aspect of the invention, a vent valve/air lock assembly is fitted within the central opening in similar fashion and for like purposes (with the auxiliary plug disconnected) to allow oxidation gases to be vented to the exterior but still prevent ambient air back into the barrel.

16 Claims, 2 Drawing Sheets

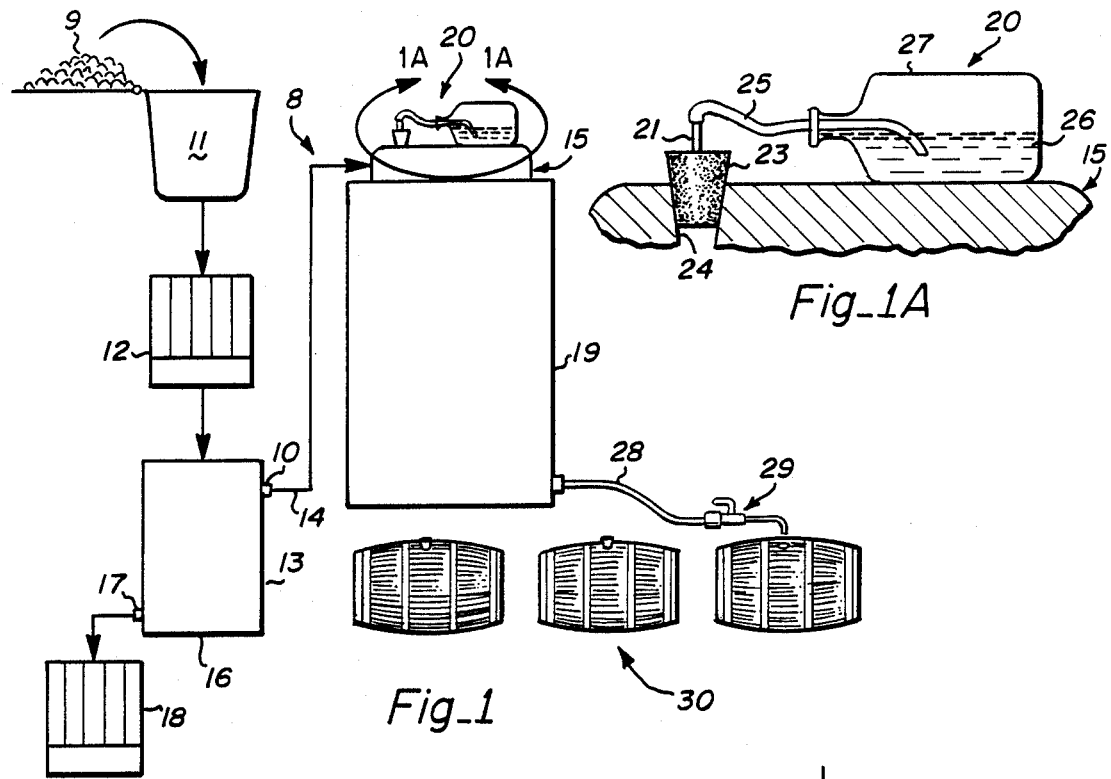
Fig_1A
Fig_1
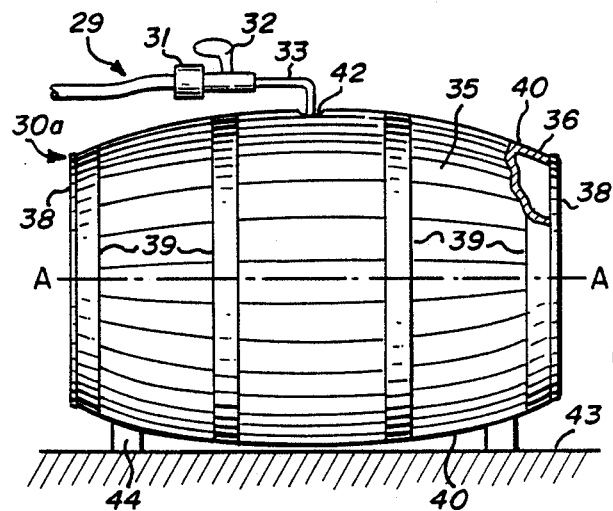
Fig_2
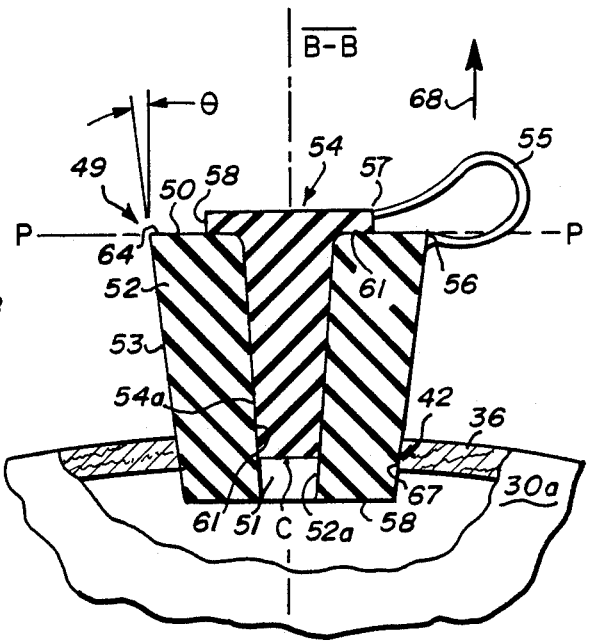
Fig_3

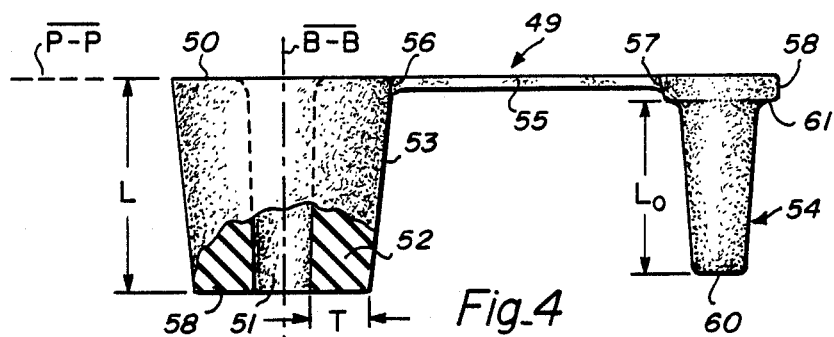
Fig_4
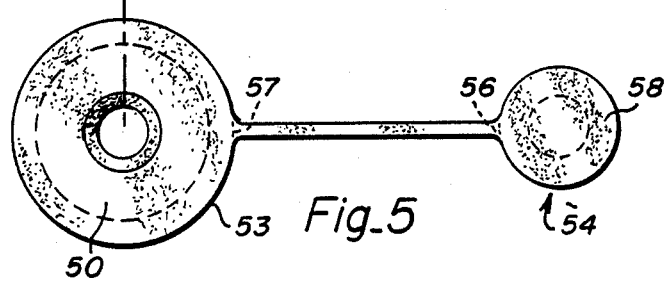
Fig_5
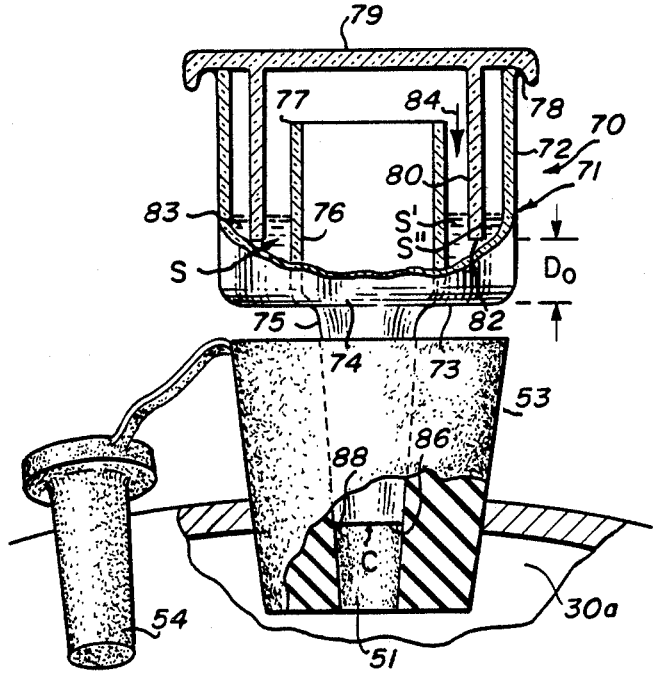
Fig_6
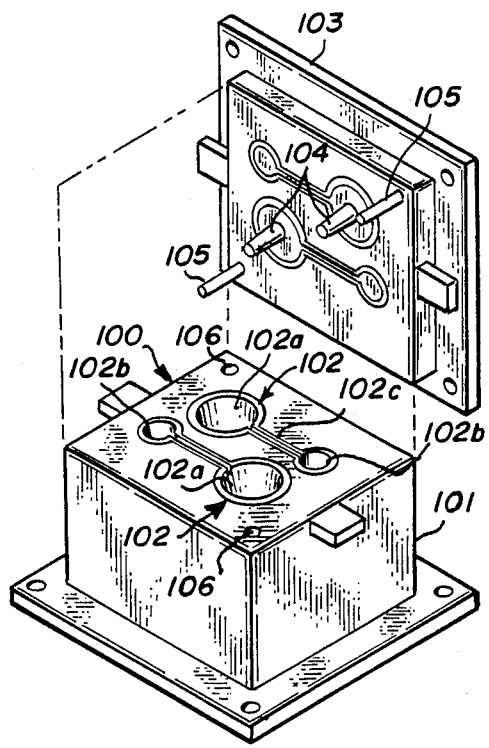
Fig_7

STOPPER AND METHOD OF USE IN ASSOCIATION WITH WINE BARRELS

INTRODUCTION

This invention relates to the making of wine and more particularly to products and processes for facilitating the aging and/or fermentation processes attendant wine making.

In accordance with the invention, a frustoconically shaped bung type stopper (hereafter "stopper") formed of silicone rubber approved by the FDA for us wine making (such as methylvinylpolysiloxane elastomers) can be releasably sealed to a wine barrel. Yet the stopper still provides for sampling of the aging wine and/or permits release of fermentation gases. In this way, all relevant items needed for venting, sealing or tasting wine can be placed and used in a convenient arrangement without undue expenditure of time and effort.

In one aspect, the stopper of the invention includes a central opening attended by an integral pliant plug of length $L_0$. The opening is defined by a circular cross section and a length "L" (measured between an annular base and a truncated tip surface) where $L_0$ is less than L. A side wall of thickness "T" is thus defined that varies a function of the length along the central opening. The side wall is rigid, however. Hence, its frustoconical surface can be sealed, air-tight, to the barrel bung (with the auxiliary plug inserted within the central opening) without the use of external sealants, waxes and the like. Yet side wall pressure acting on the auxiliary plug is neither too large to prevent manual removal of the plug for sampling progress nor too small to permit the passage of ambient air back into the barrel between the co-acting surfaces.

In another aspect of the invention, a vent valve/air lock assembly is fitted within the central opening in similar fashion and for like purposes (with the auxiliary plug disconnected) to allow oxidation gases to be vented to the exterior but prevent entry of air back into the barrel.

DEFINITIONS

The term "methylvinylpolysiloxane elastomer" refers to a silicone rubber formulation provided by heating silicon in a methyl chloride environment to methylchlorosilanes. The latter is an intermediate that after being reacted with hydroxyl groups, can be separated and then purified and augmented to form the desired elastomer. A suitable elastomer is methylvinylpolysiloxane purchased from the Dow Corning Chemical Company and thence the Boyd Corporation of Pleasanton, California.

The term "frustoconical surface" is defined by straight lines intersecting the edge of the annular base of the stopper and the apex so the resulting surface tapers evenly between the base and truncated tip surfaces.

The term "vent valve/air lock assembly" is defined as a conventional piece of manufacturing apparatus for both venting oxidation gas under pressure from the barrel or tank through a liquid reservoir while preventing entry of air back into the barrel. One such model consists of a sealed tube in place within an opening of a stopper. The latter attaches via a flexible tube to a position beneath a liquid reservoir level in a jug lying on its side. In another model, the flexible tube is eliminated by forming the reservoir in an annular space formed between a glassware cup and a central annular vent tube connected to the cup bottom, the vent tube being in fluid contact with the interior of the barrel though a funnel and a central opening in the bottom of the cup. Vent gases eventually force the reservoir level below a side wall of a hat-shaped cap member atop the cup so the oxidation gases can escape. However, ambient air cannot re-enter the barrel.

BACKGROUND

A distinction must be made between use of the present invention in primary and secondary fermentation processes involved in wine making and in aging of the wine after fermentation has been completed.

In conventional wine making, after the grapes have been washed with, say sulfur dioxide they are passed through the stemmer-crusher where they are desteamed and crushed. The resulting "must" is transferred to a separation tank. Next, the "free running" juice is separated from the skin and seeds in the presence of nitrogen. Then the free-running juice is racked within a fermentation tank and is allowed to begin fermentation by the introduction of starter yeast. (The separated seeds and skins are also removed and re-processed via a wine press to provide pressed wine juice and pumice, the latter being discardable at a dump site.) Within the fermentation tank, temperature is controlled by means of a heat exchanger jacketed at the exterior of the tank to control the rate of fermentation. A vent valve/air lock assembly allows escape of oxidation gases from the tank while simultaneously preventing entry of ambient air back into the tank. After a time, fermentation is complete, and the resulting wine is emptied into a series of barrels through a filling wand or spicket where secondary fermentation and/or aging begins. In both of these circumstances, injection of a nitrogen cap usually proceeds the filling operation. In the former situation, the barrel can also be fitted with a vent/air lock assembly. In the latter, the wine is sampled from time-to-time using a thief tube. (Moreover, if primary barrel fermentation is to occur akin to champagne bottle fermentation processes, the barrel must be first fitted with a similar vent/air lock assembly. After fermentation is completed, sampling follows).

While solid stoppers formed of FDA approved silicone rubber are available for releasably sealing wine barrels, such stoppers heretofore have not been provided with central openings or with integrally attached auxiliary plugs. Hence, sampling of the wine after fermentation, has to occur with the stopper removed and a thief tube inserted into the barrel. Then the stopper is re-inserted. Eventually friction forces can erode enough of the surface of the stopper to prevent proper sealing and permit ambient air and external bacteria (enemies of good wine makers) to enter the barrel and attack the wine.

When fermentation is occurring, the vent valve/air lock assembly previously mentioned, is used. This requires purchasing solid stoppers and then modifying them with an opening for the valve/air lock assembly. Often the opening is too large, allowing the stopper too much flexibility to properly seat within the bunghole. Eventually, the modified drilled stopper must be removed and replaced by a conventional solid stopper. Since there are many hundreds of barrels within even small wineries, under-ordering or over-ordering of solid stoppers is a common occurrence. Additional follow-up purchases are often needed. In addition, on-site modifications are expensive and time consuming. Further, the re-manufactured stoppers eventually have to be replaced as aging of the wine begins. Accordingly, there is a need to provide a barrel stopper formed of an FDA approved elastomer but configured so that after sealing just once to the bunghole of the barrel, attendant wine making processes can be ac without the inserted stopper having to be removed, either to accommodate a vent valve/air lock assembly or for inserting a thief tube for sampling purposes.

SUMMARY

In accordance with the invention a frustoconically shaped stopper formed of silicone rubber approved by the FDA for use in wine making (such as methylvinyl-polysiloxane elastomers) can be releasably sealed to a wine barrel, but still provide for sampling of the wine and/or release of the fermentation gases. In this way, all equipment needed for venting, heating and tasting wine can be placed and used in a convenient arrangement with minimum expenditure of time and effort.

In one aspect, the stopper of the invention includes a central opening attended by an integral pliant plug having a shaft of length $L_0$. The central opening is defined by a circular cross section and a length L (measured between an annular base and a truncated tip surface) where $L_0$ is less than L. A side wall of thickness T is defined. The thickness T varies as a function of the length along the central opening. The side wall is rigid, however. Hence, its frustoconical surface can be sealed, air-tight, within the barrel bunghole, with the auxiliary plug inserted within the central opening without the use of external sealants, waxes and the like. Yet side wall pressure acting as the auxiliary plug is neither too large to prevent manual removal of the plug for sampling purposes nor too small to pass back air into the barrel between the co-acting surfaces.

In another aspect of the invention, a vent valve/air lock assembly is fitted within the central opening in similar fashion and for like purposes (with the auxiliary plug disconnected) to allow oxidation gases to be vented to the exterior but prevent entry of air into the barrel.

The frustoconical surface of the stopper preferably has a constant angle $\phi$ between $\frac{1}{2}$ to 10 degrees measure between a normal through the circumferential edge and a series of straight lines through the apex. A preferred range is between about 4 to 6 degrees with a value of about 5½ degrees being superior for bunghole openings of about 1⅞ inches and of similar shape. In a typical embodiment, length L of the stopper is about 2.1 inches while the length $L_0$ of the auxiliary plug (measured along the plug body) is 1¾ inches. If the bunghole diameter is about 1⅞ inches, either the tip of the auxiliary plug is above a longitudinal plane through the centroid of the bunghole or slightly below it. Hence the full extent of the side wall pressure is neither too large to prevent manual removal of the plug as previously explained nor too small to allow air back into the barrel.

After normal radiusing, the side wall thickness starts at 0.7 inches exterior of then bunghole then falls incrementally to 0.613 inches interior of the bunghole. Similarly, the central opening defines a constant diameter of 0.6 inches under such circumstances.

DRAWINGS

FIG 1 is a block diagram of a wine making process for filling a series of barrels for which the stopper of the present inventions is useful;

FIG. 2 is a side elevational view of a barrel being filled;

FIG. 3 is enlarged fragmentary view of the side elevation of FIG. 2, partially cut away, to illustrate the insertion of an auxiliary plug within a central opening of the stopper and wherein the stopper, in turn, is inserted into the barrel bunghole to seal the contents against escape;

FIG. 4 is a side elevational view of the stopper of the invention decoupled from the barrel of FIG. 3;

FIG. 5 is a top view of the stopper of FIG. 4;

FIG. 6 is another side elevational view of the barrel of FIG. 2, partially cut away, and enlarged to illustrate use of the stopper of the invention in connection with a vent valve/air lock assembly; and FIG. 7 is a partial perspective view of a mold useful in manufacturing the stopper of the invention.

DETAILED DESCRIPTION OF THE BEST MODE OF THE INVENTION

The following is a detailed description of preferred embodiments of the present invention and is presented by way of example only and is not intended to limit its applicable principles. Furthermore, the description is intended to clearly enable one skilled in the art to make and use the invention. It also includes various adaptations, variations, alternatives and different uses of the invention including what is presently believed to be the best mode of carrying out the invention.

FIG. 1 is a block diagram of a typical wine making process 8 in which the present invention has been found to be useful.

In the process 8, the picked grapes 9 are first washed with sulfur dioxide at vat 11 and then transferred to a steamer/crusher 12 where the grapes are destemmed, and then crushed. The resulting mixture, called "must", is transferred to a separation tank 13 where after a time the free running juice is fed via line 14 and valve 10 to a fermentation tank 15. The skin and seeds remain at the bottom 16 of the separation tank 13. Removal of the latter for further processing, occurs via valve 17 and thence to wine press 18.

The tank 15 is provided with a heat exchanger jacket 19. Temperature of the "must" can thus be either increased or decreased by the associated operation of the heat exchanger jacket 19 (after the starter yeast has been injected into the tank 15).

A vent valve/air lock assembly generally indicated 20 atop the tank 15, is placed in fluid with the interior of the tank as shown in FIG. 1a. Assembly 20 includes a cylindrical tube 21 and a stopper 23. The stopper 23 is neither permanently nor fixedly attached to opening 24 of the tank 15 but can be removed as required. Oxidation gases pass from the tube 21 through flexible hose 25 to a liquid reservoir 26 captured within a jug 27 turned on-side (rather than on-end). As long as the hose 25 is beneath the surface of the reservoir 26, ambient air cannot enter back into the tank 15 but oxidation gases can escape. After a time (measurable by alcohol content, to say 9- to 14% by volume), fermentation is determined to be complete. Then resulting wine feedstock is emptied from the tank 15 of FIG. 1 via flexible line 28, and thence through a valved filling wand 29 to a series of barrels generally indicated at 30.

FIG. 2 illustrates the operation of the valved filling wand 29 in association with a barrel 30a in more detail.

As shown, the valved filling wand 29 is conventional and includes a clamp 31, a petcock valve 32 and a metallic nozzle 33 shaped as shown. The barrel 30a includes a series of curved staves 35 forming bulging side wall 36 (hereafter referred to as "side wall 36") terminating in flat end walls 38, and a bunghole 42. The nozzle 33 of the wand 29 fits within the bunghole 42 of the barrel 30a. Activation of the valve 32, permits the filling of the barrel. In order to seal the staves 35 to either each other or to the end wall 38, hoops 39 are placed at the circumferential surface 40 of the side wall 36 coaxial with axis of symmetry A—A of the side wall 36. A mid-plane measured from the end walls 38 (transverse of axis of symmetry A—A), determines the location of the bunghole 42. When the barrel 30a is positioned so that the axis of symmetry A—A is parallel to the earth's surface 43 (as on cross-supports 44) the maximum volume of the barrel 30a is exposed to the wand 29. When the proper level is reached, the valve 32 of the wand 29 can be deactivated after which, the nozzle 33 is then removed and the bunghole 42 closed.

FIG. 3 illustrates a portion of side wall 36 of the barrel 30a of FIG. 2 in section wherein a stopper 49 of the present invention is fitted within the bunghole 42.

As shown, the stopper 49 includes an annular upper base 50, a central opening 51, a side wall 52 and an exterior frustoconical surface 53. An auxiliary plug 54 is slidably attached within the opening 51 as well as being fitted with an integral tether line 55 fixedly attached between edge 56 of the base 50 and edge 57 of the shoulder 58 of the plug 54. The frustoconical surface 53 is defined by an angle $\phi$ formed between (i) a series of imaginary straight lines intersecting edge 56 of the base 50 and the apex (not shown) along axis of symmetry B—B and (ii) a transverse plane parallel to the axis of symmetry B—B.

FIGS. 4 and 5 show stopper 49 (and attached auxiliary plug 54) in still more detail wherein the stopper 49 is detached from the barrel 30a of FIGS. 2 and 3.

As shown, length L of the central opening 51 is measured along axis of symmetry B—B between base 50 and truncated tip surface 58. While length $L_0$ of the auxiliary plug 54 is measured between end section 60 and end wall 61 of shoulder 58. Central opening 51 is of circular cross section and is enlarged at its intersection with the base 50 to facilitate easy entry of, inter alia, the auxiliary plug 54. The side wall 52 has a thickness T that varies linearly as a function of length L. The side wall 52 is rigidly formed, however. Length $L_0$, of course, is less than length L. Lengths L and $L_0$ also are seen to end (or begin) at the same longitudinal normalizing plane P—P in FIG. 3, the normalizing plane P—P intersecting both the upper surface 64 of base 50 and the annular end wall 61 of the shoulder 58 of the auxiliary plug 54.

The bunghole 42 of the barrel 30a includes a sloping side wall 67 that is placed in slidable surface contact with the frustoconical surface 53 of the stopper 49 when the barrel 30a is sealed. But because the end section 60 of the shaft 54a of the plug 54 is oriented so as to be positioned either just above or just below centroid C of the bunghole 42, radial pressure acting on the plug 54 (due to spacial displacement of the stopper 49 relative to the bunghole 42) are neither too large (to prevent manual removal of the plug 54) nor too small to pass ambient air back into the barrel 30a between the co-acting surfaces of the plug 54 and the interior surface 52a of the side wall 52.

However, when the wine within the barrel 30a is to be sampled, the auxiliary plug 54 can be manually removed from within the central opening 51 by grasping the shoulder 58 of the plug 54 and applying force in the direction of arrow 68. This permits the central opening 51 to be freed from the plug 54 so that it can then accommodate a common thief tube, not shown.

FIG. 6 illustrates after the auxiliary plug 54 has been removed from the central opening 51, that the latter can then be employed to accommodate a glassware vent valve/air lock assembly 70 with surprising effectiveness in association with barrel 30a.

As shown, the assembly 70 includes a cylindrical cup 71 having a side wall 72, a bottom wall 73 and a central opening 74. Between the side wall 72 and central opening 74 is a cylindrical vent tube 76. The tube 76 sits on the bottom wall 73 of the assembly 70 but terminates in the opposite direction at edge 77 below edge 78 of the side wall 72. Consequentially, a hat shaped cap member 79 having integral sidewall 80 can be attached at the edge 78 of the cup 71. When cap member 79 is so attached, the integral side wall 80 is disposed within the annular space (denoted as S' and S") defined by cylindrical vent tube 76 and side wall 72. Integral side wall 80 terminates at edge 82, a distance $D_0$ above bottom wall 73. Scalloping the terminal edge 82 of the side wall 80, enhances operations as described below.

After a liquid reservoir (as generally indicated at 83) has been formed in the space S, fermentation gases change the relative heights of the bifurcated reservoirs S' and S" as a function of pressure v. liquid weight. That is, the liquid with space S' is first driven downward in the direction of arrow 84 by the action of such gases, causing the liquid of space S" to rise. Eventually the level of the liquid in the space S' is below the scalloped edge 82 of the side wall 80. Under that condition, the gases can escape to the exterior. However, the liquid with the space S" still prevents passage of ambient air back into the barrel 30a.

Note that the funnel 75 has an end edge 86 that is constructed to terminate either just above or just below centroid C of the bung 42. Consequentially, the radially acting pressure (due to the spacial interaction of side walls 52 and 67 of the stopper 49 and bung 42, respectively, as relative movement occurs) is neither too large to prevent manual removal of the assembly 70, nor too small to permit passage of ambient air back into the barrel 30a between exterior surface 88 of the funnel 75 and the interior surface of the side wall 52.

MANUFACTURE AND USE OF STOPPER 49 OF THE INVENTION

FIG. 7 illustrates a two-part permanent mold 100 by which the stoppers of the present invention are manufactured. As shown, bottom 101 of the mold 100 includes two sets of linked pairs of cavities generally indicated at 102. Each set includes a separate cavity 102a for forming the stopper of the invention minus the auxiliary plug, and an additional cavity 102b for the purpose of forming the auxiliary plug. The cavities 102a and 102b are linked by tether line 102c. The top 103 of the mold 100 includes a pair of shafts 104 that penetrate the center of the cavities 102a when top 103 and bottom 101 are formed together. The shafts 104 help form the central opening and side wall of the stopper of the invention. A set of guides 105 are also provided that mate with openings 106. These elements also aide in permitting the top 103 and bottom 101 to be properly joined. Entryways permit injection of FDA approved silicone rubber in a form suitable for molding.

FDA approved silicone rubber used when mold 100 is a formulation comprising any of a large group of organosiloxane polymers and consist of alternate silicon and oxygen atoms with various organic radicals attached to the silicon:

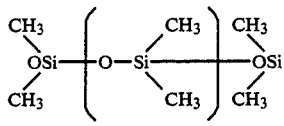

In a preferred form, the molecular weight and degree of polymerization of the silicon are controlled based on the straight chain structure. It is also stable over a wide temperature range, has low surface tension, excellent dielectric properties, water repellency, high lubricity, good resistance to oxidation, to weathering and to high temperatures as well as being non-toxic and approved by the FDA for use in wine making.

It is usually derived by heating silicon (usually single crystals) in a methyl chloride environment to yield methylchlorosilanes. The latter is an intermediate and after being reacted to hydroxyl groups is then separated, purified and augmented to yield elastomers of the desired characteristics, commonly called methylvinylpolysiloxane elastomers. Such elastomers are suitable for use in the wine industry. A suitable version can be purchased from Dow Corning Chemical Company and thence the Boyd Corporation of Pleasanton, Calif.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A wine barrel stopper formed of silicone rubber approved by the FDA for use in wine making, and sealable to a bunghole of a wine barrel, comprising:
   (i) a side wall defining a central opening, an axis of symmetry, and a frustoconical outer surface to be seated within said barrel bunghole; and
   (ii) an integral auxiliary plug configured to and capable of being seated with said central opening of said side wall whereby side wall pressure due to spacial displacement of said stopper relative to said bunghole is neither too large to prevent manual removal of said auxiliary plug from said central opening nor too small to permit the passage of ambient air back into the barrel between co-acting surfaces thereof.

2. The stopper of claim 1 in which said side wall includes terminating base and top surfaces parallel to each other and transverse to said axis of symmetry.

3. The stopper of claim 2 in which said axis of symmetry of said side wall is collinear with that of said central opening and in which said frustoconical surface is defined by an angle $\phi$ measured between a plane defined by said base surface and parallel to said axes of symmetry and a series of straight lines through an apex intersecting said axes adjacent to said tip surface.

4. The stopper of claim 3 in which angle $\phi$ is in a range between 4 and 10 degrees and such range is matched to a similarly defined angle of said barrel bunghole.

5. The stopper of claim 4 in which angle $\phi$ is in a range between 4 and 6 degrees.

6. The stopper of claim 4 in which angle $\phi$ is about $5\frac{1}{2}$ degrees.

7. The stopper of claim 1 in which said central opening is circular in cross section and has a length L.

8. The stopper of claim 7 in which said auxiliary plug includes a shaft of length $L_0$ sealable to said central opening as well as having an enlarged shoulder positioned exterior of said central opening where $L_0$ is less than L and L is the length of said central opening.

9. The stopper of claim 8 with the addition of a vent valve/air lock assembly having a funnel configured to and capable of being seated within said central opening of said side wall whereby side wall pressure due to spacial displacement of said stopper relative to said bunghole along said axis of symmetry is neither too large to prevent manual removal of said funnel from said central opening nor too small to permit the passage of said ambient air back into the barrel between co-acting surfaces thereof.

10. The stopper of claim 9 in which said vent assembly comprises a cylindrical cup having a side wall; a bottom wall; a central opening; a funnel in fluid contract with said central opening; a vent tube in contact with said bottom wall; and a hat shaped cap member in contact with said side wall whereby a liquid reservoir is provided which permits fermentation gases to escape but prevents entry of said ambient air back into said barrel.

11. The stopper of claim 9 in which said hat shaped cap member includes a crown in contact with an upper edge of said side wall of said cup and integral side wall positioned in the annular space between said side wall of said cup and said vent tube, said integral side wall terminating a distance $D_0$ above said bottom wall whereby defined bifurcated annular spaces S' and S'' can be filled with movable liquid to release said fermentation gases but still prevent said ambient air from reentry into said barrel.

12. The stopper of claim 1 in which said silicon rubber formulation is selected from the group comprising methylvinylpolysiloxanes elastomers.

13. The stopper of claim 12 in which said methylvinylpolysiloxanes elastomers are formed by the steps of heating silicon in a methyl chloride environment to yield methylchlorosilane, reacting the methyl chlorosilanes with hydroxyl groups, and after separating the products of reaction, formulating elastomers suitable for FDA approved uses in wine making.

14. The method of inserting and using a stopper formed of silicone rubber approved by the FDA for use in wine making relative to a bunghole of a wine barrel, said stopper comprising a side wall defining a central opening, an axis of symmetry, and a frustoconical outer surface to be seated within said barrel bunghole, and an integral auxiliary plug configured to and capable of being seated within said central opening, comprising the steps of:
   (i) applying force to said terminating base surface of said stopper to cause travel of said stopper relative to said barrel bunghole;

(ii) terminating travel when a terminating plane defines a side wall pressure about said central opening that is neither too large to prevent manual removal of nor too small to prevent the passage of ambient air relative to an exterior surface of one of (a) an integral auxiliary plug and (b) a vent valve/air lock assembly, with a co-acting surface of said central opening.

15. The method of claim 14 in which travel is terminated in step (ii) when the terminating lane intercepts one of (a) an end of the auxiliary plug and (b) an end of a funnel of the vent valve/air lock assembly, slightly above a centroid of said bunghole.

16. The method of claim 15 in which travel is terminated in step (ii) when the terminating plane of one of (a) and (b) is slightly below the centroid.

* * * * *